US009966033B2

(12) United States Patent
Liu

(10) Patent No.: US 9,966,033 B2
(45) Date of Patent: May 8, 2018

(54) DETECTION DEVICE FOR DISPLAY PANEL

(71) Applicant: Shenzhen China Star Optoelectronics Technology Co., Ltd., Shenzhen (CN)

(72) Inventor: Siyang Liu, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 2 days.

(21) Appl. No.: 15/118,102

(22) PCT Filed: May 10, 2016

(86) PCT No.: PCT/CN2016/081562
§ 371 (c)(1),
(2) Date: Aug. 11, 2016

(87) PCT Pub. No.: WO2017/177492
PCT Pub. Date: Oct. 19, 2017

(65) Prior Publication Data

US 2017/0301113 A1 Oct. 19, 2017

(30) Foreign Application Priority Data

Apr. 13, 2016 (CN) .......................... 2016 1 0227717

(51) Int. Cl.

| | |
|---|---|
| ***G09G 3/34*** | (2006.01) |
| ***H04N 9/64*** | (2006.01) |
| ***H04N 9/77*** | (2006.01) |
| ***G09G 5/00*** | (2006.01) |
| ***G09G 5/02*** | (2006.01) |

(52) U.S. Cl.
CPC ................. *G09G 5/00* (2013.01); *G09G 5/02* (2013.01); *G09G 2340/06* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,852,480 | A * | 12/1998 | Yajima | G02F 1/136204 349/39 |
| 7,336,093 | B2 * | 2/2008 | Uei | G09G 3/006 324/760.01 |
| 2001/0055081 | A1 * | 12/2001 | Shigeta | G02F 1/133621 349/106 |
| 2005/0168490 | A1 * | 8/2005 | Takahara | G09G 3/2014 345/690 |
| 2016/0079333 | A1 * | 3/2016 | Shishido | H01L 27/3218 257/72 |
| 2016/0334934 | A1 * | 11/2016 | Mo | G02F 1/13338 |
| 2017/0162121 | A1 * | 6/2017 | Yang | G09G 3/3266 |
| 2017/0214906 | A1 * | 7/2017 | Yang | H04N 13/0418 |

* cited by examiner

*Primary Examiner* — Wesner Sajous

(57) ABSTRACT

The present disclosure proposes a detection device for a display panel. The detection device includes twelve signal source input terminals for inputting a detection signal, and twelve shorting bars corresponding to the signal source input terminals one on one. One end of the shorting bar is connected to the corresponding signal source input terminal, and the other end of the shorting bar is connected to a corresponding data line on the display panel.

9 Claims, 5 Drawing Sheets

DETECTION DEVICE FOR DISPLAY PANEL

RELATED APPLICATIONS

This application is a National Phase of PCT Patent Application No. PCT/CN2016/081562 having International filing date of May 10, 2016, which claims the benefit of priority Chinese Patent Application No. 201610227717.9 filed on Apr. 13, 2016. The contents of the above applications are all incorporated by reference as if fully set forth herein in their entirety.

FIELD AND BACKGROUND OF THE INVENTION

The present invention relates to the field of panel detection, and more particularly, to a detection device for a display panel.

With the development of the technology, the requirement for better display of display panels is more increasing. A conventional display panel is known as a red, green, and blue (RGB) display panel and a red, green, blue, and white (RGBW) display panel. The RGB display panel comprises a red pixel unit, a green pixel unit, and a blue pixel unit. The RGBW display panel comprises a red pixel unit, a green pixel unit, a blue pixel unit, and a white pixel unit.

Display panels are tested for lighting prior to shipment. An ordinary testing is to check if display panels show purely white images, purely red images, purely green images, and purely blue images. Please refer to FIG. 1 showing a schematic diagram of the structure of a conventional detection device for a conventional RGB display panel. R represents a red signal source, G represents a green signal source, and B represents a blue signal source. The red signal source R is connected to all of the red pixel units on the RGB display panel through a red shorting bar. The green signal source G is connected to all of the green pixel units on the RGB display panel through a green shorting bar. The blue signal source B is connected to all of the blue pixel units on the RGB display panel through a blue shorting bar.

Please refer to FIG. 2 showing a schematic diagram of the structure of a conventional detection device for a conventional RGBW display panel. R represents a red signal source, G represents a green signal source, B represents a blue signal source, and W represents a white signal source. The red signal source R is connected to all of the red pixel units on the RGB display panel through a red shorting bar. The green signal source G is connected to all of the green pixel units on the RGB display panel through a green shorting bar. The blue signal source B is connected to all of the blue pixel units on the RGB display panel through a blue shorting bar. The white signal source W is connected to all of the white pixel units on the RGB display panel through a white shorting bar.

Conventional manufacturers of display panels usually detect the RGB display panels and the RGBW display panels with the same detection devices. Please refer to FIG. 3 showing the use of a detection device for conventional RGB display panels to detect RGBW display panels. FIG. 3 is a schematic diagram of using a conventional detection device for a conventional RGB display panel to detect a RGBW display panel. The detection device for the conventional RGB display panel comprises three shorting bars while the RGBW display panel comprises four pixel units. So the detection device can merely detect a totally bright image of the RGBW display panel but fails to detect a red image, a green image, and a blue image respectively.

As for the use of a detection device for the conventional RGBW display panel to detect a RGB display panel, please refer to FIG. 4. FIG. 4 is a schematic diagram of using a conventional detection device for the conventional RGBW display panel to detect a RGB display panel. The detection device for the conventional RGBW display panel comprises four shorting bars, but the RGB display panel only comprises three pixel units. So the detection device can merely detect a totally bright image of the RGB display panel while fails to detect a red image, a green image, and a blue image respectively.

Therefore, it is necessary to offer a detection device for a display panel for resolving the problem occurring in the conventional technology.

SUMMARY OF THE INVENTION

An object of the present invention is to propose a detection device. The present invention makes it come true that the pure color detection for images with diverse colors is successfully conducted on the RGBW and RGB display panels. With this detection device, the problem occurring in the conventional technology that both of the RGBW and RGB display panels cannot undergo pure color detection in the conventional detection device is successfully resolved.

According to the present invention, a detection device for a display panel is provided. The detection device comprises twelve signal source input terminals, for inputting a detection signal, and twelve shorting bars corresponding to the signal source input terminals one on one. One end of the shorting bar is connected to the corresponding signal source input terminal, and the other end of the shorting bar is connected to a corresponding data line on the display panel. An nth shorting bar is connected to an (n+12m)th data line on the display panel where n is a positive integer smaller than and equal to twelve, and m is a non-negative integer. The detecting signal is input to all of the signal source input terminals when the display panel is a red, green, and blue (RGB) display panel for detecting a totally bright image shown on the RGB display panel. The detecting signal is input to all of the signal source input terminals when the display panel is a red, green, blue, and white (RGBW) display panel for detecting a totally bright image shown on the RGBW display panel.

In one aspect of the present invention, the RGB display panel comprises a first pixel, a second pixel, and a third pixel. The detecting signal is input to a (3a+1)th signal source input terminal to detect a pure color image which the first pixel corresponds to when the display panel is the RGB display panel, and a is a non-negative integer.

In another aspect of the present invention, the RGB display panel comprises a first pixel, a second pixel, and a third pixel. The detecting signal is input to a (3a+2)th signal source input terminal to detect a pure color image which the first pixel corresponds to when the display panel is the RGB display panel, and a is a non-negative integer.

In another aspect of the present invention, the RGB display panel comprises a first pixel, a second pixel, and a third pixel. The detecting signal is input to a (3a+3)th signal source input terminal to detect a pure color image which the first pixel corresponds to when the display panel is the RGB display panel, and a is a non-negative integer.

In another aspect of the present invention, the RGBW display panel comprises a first pixel, a second pixel, a third pixel, and a fourth pixel. The detecting signal is input to a (4a+1)th signal source input terminal to detect a pure color image which the first pixel corresponds to when the display panel is the RGBW display panel, and a is a non-negative integer.

In another aspect of the present invention, the RGBW display panel comprises a first pixel, a second pixel, a third pixel, and a fourth pixel. The detecting signal is input to a (4a+2)th signal source input terminal to detect a pure color image which the first pixel corresponds to when the display panel is the RGBW display panel, and a is a non-negative integer.

In still another aspect of the present invention, the RGBW display panel comprises a first pixel, a second pixel, a third pixel, and a fourth pixel. The detecting signal is input to a (4a+3)th signal source input terminal to detect a pure color image which the first pixel corresponds to when the display panel is the RGBW display panel, and a is a non-negative integer.

In yet another aspect of the present invention, the RGBW display panel comprises a first pixel, a second pixel, a third pixel, and a fourth pixel. The detecting signal is input to a (4a+4)th signal source input terminal to detect a pure color image which the first pixel corresponds to when the display panel is the RGBW display panel, and a is a non-negative integer.

According to the present invention, a detection device for a display panel is provided. The detection device comprises twelve signal source input terminals, for inputting a detection signal, and twelve shorting bars corresponding to the signal source input terminals one on one. One end of the shorting bar is connected to the corresponding signal source input terminal, and the other end of the shorting bar is connected to a corresponding data line on the display panel. An nth shorting bar is connected to an (n+12m)th data line on the display panel where n is a positive integer smaller than and equal to twelve, and m is a non-negative integer.

In one aspect of the present invention, the detecting signal is input to all of the signal source input terminals when the display panel is a red, green, and blue (RGB) display panel for detecting a totally bright image shown on the RGB display panel.

In another aspect of the present invention, the RGB display panel comprises a first pixel, a second pixel, and a third pixel. The detecting signal is input to a (3a+1)th signal source input terminal to detect a pure color image which the first pixel corresponds to when the display panel is the RGB display panel, and a is a non-negative integer.

In another aspect of the present invention, the RGB display panel comprises a first pixel, a second pixel, and a third pixel. The detecting signal is input to a (3a+2)th signal source input terminal to detect a pure color image which the first pixel corresponds to when the display panel is the RGB display panel, and a is a non-negative integer.

In another aspect of the present invention, the RGB display panel comprises a first pixel, a second pixel, and a third pixel. The detecting signal is input to a (3a+3)th signal source input terminal to detect a pure color image which the first pixel corresponds to when the display panel is the RGB display panel, and a is a non-negative integer.

In another aspect of the present invention, the detecting signal is input to all of the signal source input terminals when the display panel is a red, green, blue, and white (RGBW) display panel for detecting a totally bright image shown on the RGBW display panel.

In another aspect of the present invention, the RGBW display panel comprises a first pixel, a second pixel, a third pixel, and a fourth pixel. The detecting signal is input to a (4a+1)th signal source input terminal to detect a pure color image which the first pixel corresponds to when the display panel is the RGBW display panel, and a is a non-negative integer.

In another aspect of the present invention, the RGBW display panel comprises a first pixel, a second pixel, a third pixel, and a fourth pixel. The detecting signal is input to a (4a+2)th signal source input terminal to detect a pure color image which the first pixel corresponds to when the display panel is the RGBW display panel, and a is a non-negative integer.

In still another aspect of the present invention, the RGBW display panel comprises a first pixel, a second pixel, a third pixel, and a fourth pixel. The detecting signal is input to a (4a+3)th signal source input terminal to detect a pure color image which the first pixel corresponds to when the display panel is the RGBW display panel, and a is a non-negative integer.

In yet another aspect of the present invention, the RGBW display panel comprises a first pixel, a second pixel, a third pixel, and a fourth pixel. The detecting signal is input to a (4a+4)th signal source input terminal to detect a pure color image which the first pixel corresponds to when the display panel is the RGBW display panel, and a is a non-negative integer.

Compared with the conventional technology, the pure color detection is successfully conducted on the RGBW display panel and the RGB display panel to detect images with diverse colors in the present invention. Twelve signal source input terminals and twelve shorting bars are arranged in the detection device proposed by the present invention. With this detection device, the problem occurring in the conventional technology that both of the RGBW and RGB display panels cannot undergo pure color detection in the conventional detection device is successfully resolved.

These and other features, aspects and advantages of the present disclosure will become understood with reference to the following description, appended claims and accompanying figures.

DESCRIPTION OF SPECIFIC EMBODIMENTS OF THE INVENTION

Figure 1:
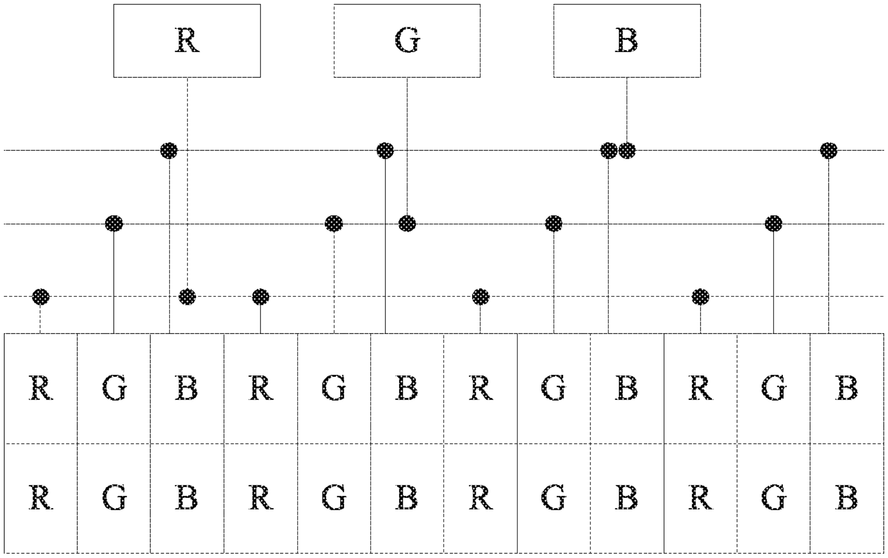
Fig. 1 (Prior art)
FIG. 1 shows a schematic diagram of the structure of a conventional detection device for a conventional RGB display panel.
Figure 2:
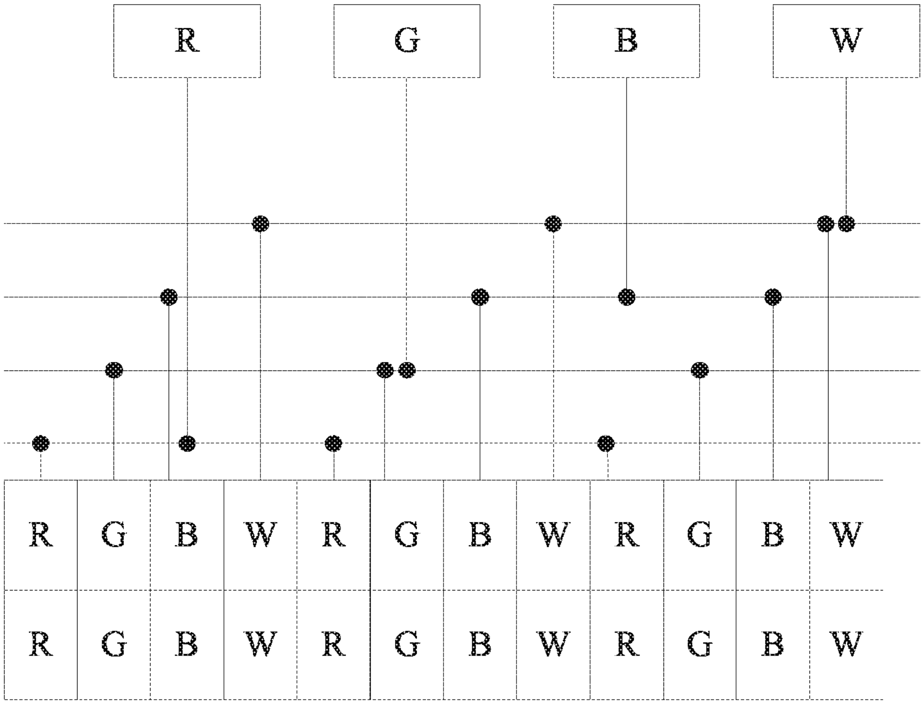
Fig. 2 (Prior art)
FIG. 2 shows a schematic diagram of the structure of a conventional detection device for a conventional RGBW display panel.
Figure 3:
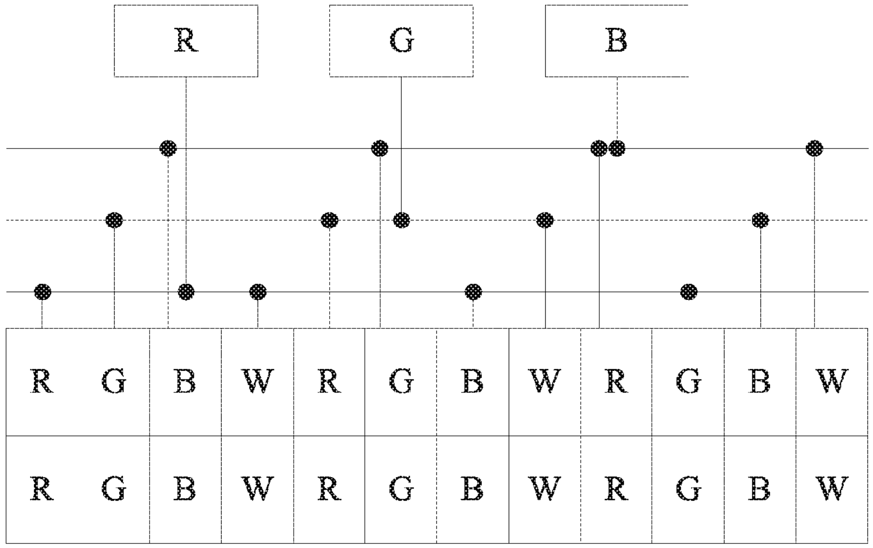
Fig. 3 (Prior art)
FIG. 3 is a schematic diagram of using a conventional detection device for a conventional RGB display panel to detect a RGBW display panel.
Figure 4:
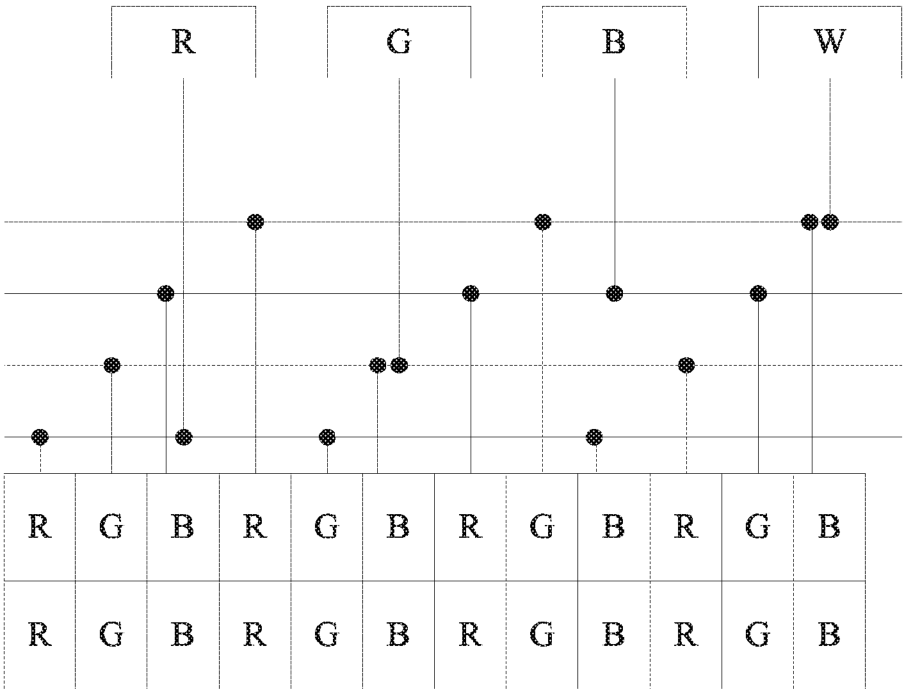
Fig. 4 (Prior art)
FIG. 4 is a schematic diagram of using a conventional detection device for the conventional RGBW display panel to detect a RGB display panel.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures.

In the drawings, components having similar structures are denoted by the same numerals.

Figure 5:
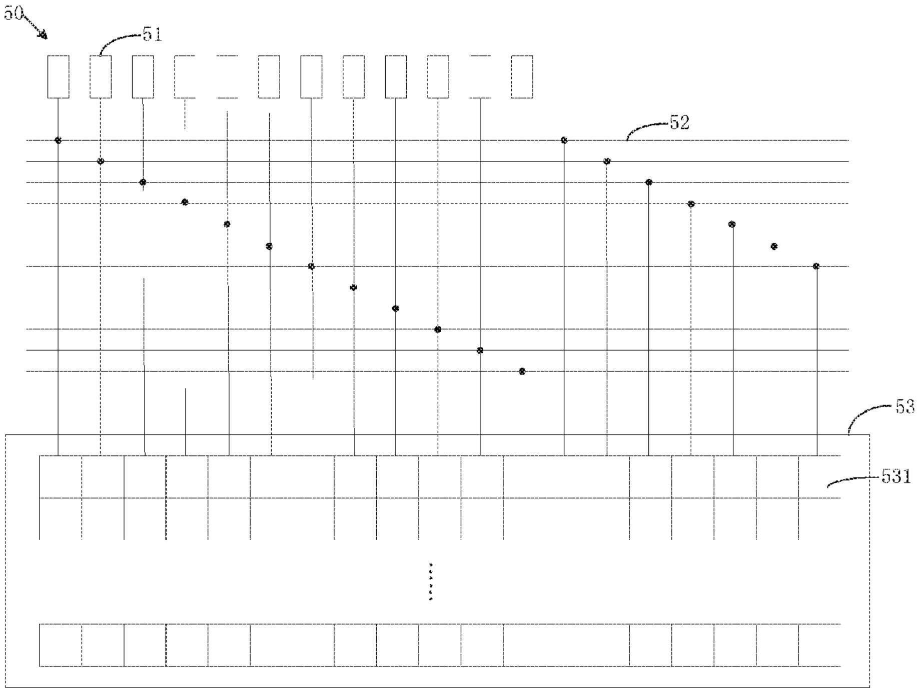
FIG. 5 is a schematic diagram of a detection device for a display panel according to one preferred embodiment of the present invention.

Please refer to FIG. 5. FIG. 5 is a schematic diagram of a detection device 50 for a display panel according to one preferred embodiment of the present invention. The detection device 50 comprises twelve signal source input terminals 51 and twelve shorting bars 52. A signal source input terminal 51 is used for inputting detection signals. A shorting bar 52 corresponds to a signal source input terminal 51 one on one. One end of the shorting bar 52 is connected to its corresponding signal source input terminal 51. The other end of the shorting bar 52 is connected to its corresponding data line on the display panel.

As FIG. 5 shows, the nth shorting bar 52 is connected to the (n+12m)th data line (i.e., the (n+12m)th pixel unit 531 in each row) on the display panel 53 where n is a positive integer smaller than and equal to twelve, and m is an non-negative integer. In other words, the first shorting bar 52 is connected to the first, the thirteenth, the twenty-fifth, . . . , and the (1+12m)th data lines on the display panel 53. The second shorting bar 52 is connected to the second, the fourteenth, the twenty-sixth, . . . , and the (2+12m)th data lines on the display panel 53 . . . . The nth shorting bar 52 is connected to the nth, the (n+12)th, the (n+24)th, . . . , and the (n+12m)th data lines on the display panel 53. It implies that the shorting bar 52 is connected to the data lines on the display panel 53 in a cycle of twelve.

Figure 6:
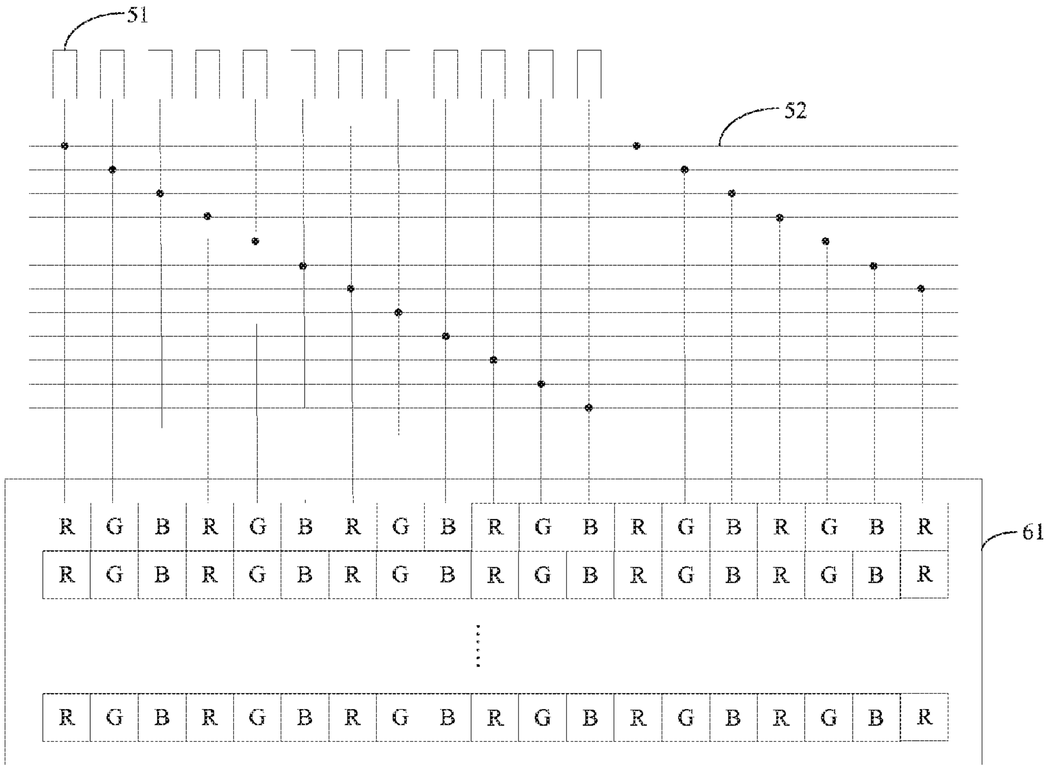
FIG. 6 is a schematic diagram of using the detection device to detect the RGB display panel according to the preferred embodiment of the present invention.

Please refer to FIG. 6. FIG. 6 is a schematic diagram of using the detection device 50 to detect the RGB display panel 61 according to the preferred embodiment of the present invention. The RGB display panel 61 detected by the detection device 50 comprises a red pixel (i.e., first pixel), a green pixel (i.e., second pixel), and a blue pixel (i.e., third pixel).

All of the signal source input terminals 51 input detecting signals to all of the pixels on the RGB display panel 61 through the shorting bars 52 to check if a totally bright image is shown on the RGB display panel 61. So the neighboring red pixel, green pixel, and blue pixel are synthesized to be a totally bright image. The detection of the totally bright image shown on the RGB display panel 61 is complete.

The first, fourth, seventh, tenth signal source input terminals 51 input detecting signals and the other signal source input terminals 51 do not input detecting signals when a totally red image shown on the RGB display panel 61 is detected. The shorting bars 52 which the first, fourth, seventh, tenth signal source input terminals 51 correspond to are connected to all of the red pixel units. So the red pixel units on the RGB display panel 61 are lit. The detection of the purely red image shown on the RGB display panel 61 is complete.

The second, fifth, eighth, eleventh signal source input terminals 51 input detecting signals and the other signal source input terminals 51 do not input detecting signals when a totally green image shown on the RGB display panel 61 is detected. The shorting bars 52 which the second, fifth, eighth, eleventh signal source input terminals 51 correspond to are connected to all of the green pixel units. So all of the green pixel units on the RGB display panel 61 are lit. The detection of the purely green image shown on the RGB display panel 61 is complete.

The third, sixth, ninth, twelfth signal source input terminals 51 input detecting signals and the other signal source input terminals 51 do not input detecting signals when a totally blue image shown on the RGB display panel 61 is detected. The shorting bars 52 which the third, sixth, ninth, twelfth signal source input terminals 51 correspond to are connected to all of the blue pixel units. So all of the blue pixel units on the RGB display panel 61 are lit. The detection of the purely blue image shown on the RGB display panel 61 is complete.

Finally, the image detection for the RGB display panel 61 is finished according to the detection procedure on the detection device 50 proposed by the preferred embodiment.

Figure 7:
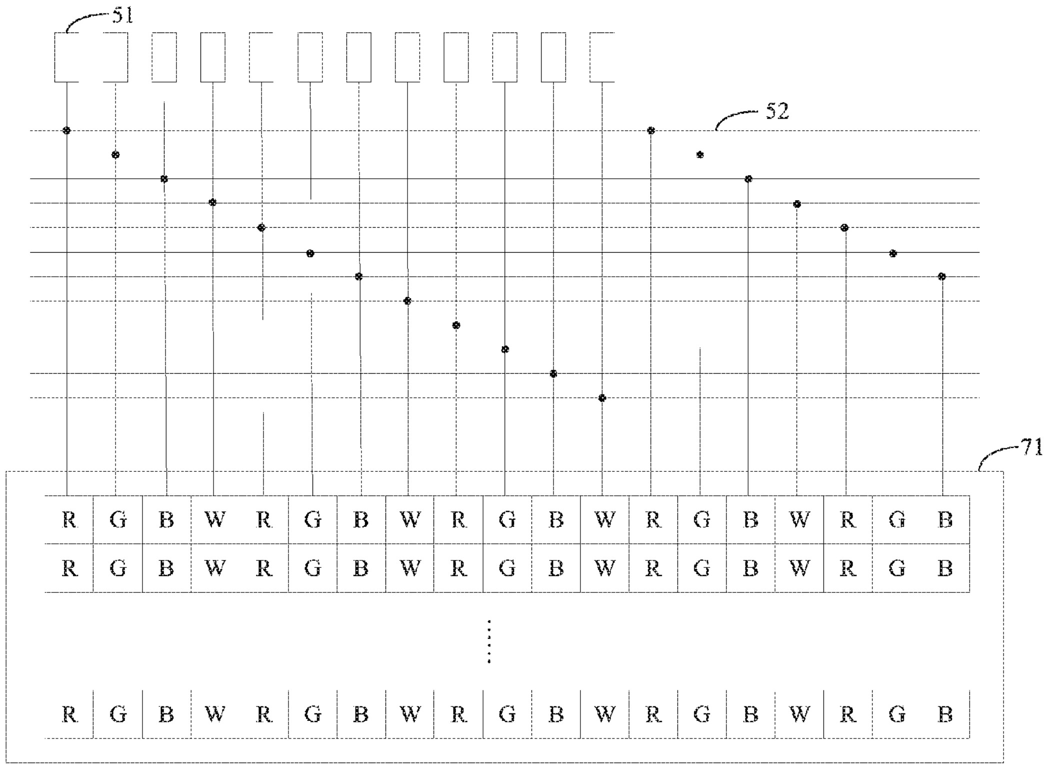
FIG. 7 is a schematic diagram of using the detection device to detect the RGBW display panel according to the preferred embodiment of the present invention.

Please refer to FIG. 7. FIG. 7 is a schematic diagram of using the detection device 50 to detect the RGBW display panel 71 according to the preferred embodiment of the present invention. The RGBW display panel 71 detected by the detection device 50 comprises a red pixel (i.e., first pixel), a green pixel (i.e., second pixel), a blue pixel (i.e., third pixel), and a white pixel (i.e., fourth pixel).

All of the signal source input terminals 51 input detecting signals to all of the pixels on the RGBW display panel 71 through the shorting bars 52 to check if a totally bright image is shown on the RGBW display panel 71. So the neighboring red pixel, green pixel, blue pixel, and white pixel are synthesized to be a totally bright image. The detection of the totally bright image shown on the RGBW display panel 71 is complete.

The first, fifth, and ninth signal source input terminals 51 input detecting signals and the other signal source input terminals 51 do not input detecting signals when a totally red image shown on the RGBW display panel 71 is detected. The shorting bars 52 which the first, fifth, and ninth signal source input terminals 51 correspond to are connected to all of the red pixel units. So all of the red pixel units on the RGBW display panel 71 are lit. The detection of the purely red image shown on the RGBW display panel 71 is complete.

The second, sixth, and tenth signal source input terminals 51 input detecting signals and the other signal source input terminals 51 do not input detecting signals when a totally green image shown on the RGBW display panel 71 is detected. The shorting bars 52 which the second, sixth, and tenth signal source input terminals 51 correspond to are connected to all of the green pixel units. So all of the green pixel units on the RGBW display panel 71 are lit. The detection of the purely green image shown on the RGBW display panel 71 is complete.

The third, seventh, and eleventh signal source input terminals 51 input detecting signals and the other signal source input terminals 51 do not input detecting signals when a totally blue image shown on the RGBW display panel 71 is detected. The shorting bars 52 which the third, seventh, and eleventh signal source input terminals 51 correspond to are connected to all of the blue pixel units. So all of the blue pixel units on the RGBW display panel 71 are lit. The detection of the purely blue image shown on the RGBW display panel 71 is complete.

The fourth, eighth, and twelfth signal source input terminals 51 input detecting signals and the other signal source input terminals 51 do not input detecting signals when a totally white image shown on the RGBW display panel 71 is detected. The shorting bars 52 which the fourth, eighth, and twelfth signal source input terminals 51 correspond to are connected to all of the white pixel units. So all of the white pixel units on the RGBW display panel 71 are lit. The detection of the purely white image shown on the RGBW display panel 71 is complete.

Finally, the image detection for the RGBW display panel 71 is finished according to the detection procedure on the detection device 50 proposed by the preferred embodiment.

Twelve signal source input terminals and twelve shorting bars are arranged in the detection device proposed by the present invention. The present invention makes it come true that the pure color detection for images with diverse colors is successfully conducted on the RGBW and RGB display panels. With this detection device, the problem occurring in the conventional technology that both of the RGBW and RGB display panels cannot undergo pure color detection in the conventional detection device is successfully resolved.

While the present invention has been described in connection with what is considered the most practical and preferred embodiments, it is understood that this invention is not limited to the disclosed embodiments but is intended to cover various arrangements made without departing from the scope of the broadest interpretation of the appended claims.

What is claimed is:

1. A detection device for a display panel, comprising:

twelve signal source input terminals, for inputting a detection signal; and twelve shorting bars, corresponding to the signal source input terminals one on one, one end of the shorting bar being connected to the corresponding signal source input terminal, and the other end of the shorting bar being connected to a corresponding data line on the display panel;

wherein an nth shorting bar is connected to an (n+12m)th data line on the display panel where n is a positive integer smaller than or equal to twelve, and m is an integer greater than zero;

wherein the detecting signal is input to all of the signal source input terminals when the display panel is a red, green, and blue (RGB) display panel for detecting a totally bright image shown on the RGB display panel;

the detecting signal is input to all of the signal source input terminals when the display panel is a red, green, blue, and white (RGBW) display panel for detecting a totally bright image shown on the RGBW display panel.

2. The detection device for the display panel of claim 1, wherein the RGB display panel comprises a first pixel, a second pixel, and a third pixel, the detecting signal is input to a (3a+1)th signal source input terminal to detect a pure color image which the first pixel corresponds to when the display panel is the RGB display panel, and a is an integer greater than zero.

3. The detection device for the display panel of claim 1, wherein the RGB display panel comprises a first pixel, a second pixel, and a third pixel, the detecting signal is input to a (3a+2)th signal source input terminal to detect a pure color image which the first pixel corresponds to when the display panel is the RGB display panel, and a is an integer greater than zero.

4. The detection device for the display panel of claim 1, wherein the RGB display panel comprises a first pixel, a second pixel, and a third pixel, the detecting signal is input to a (3a+3)th signal source input terminal to detect a pure color image which the first pixel corresponds to when the display panel is the RGB display panel, and a is an integer greater than zero.

5. The detection device for the display panel of claim 1, wherein the RGBW display panel comprises a first pixel, a second pixel, a third pixel, and a fourth pixel, the detecting signal is input to a (4a+1)th signal source input terminal to detect a pure color image which the first pixel corresponds to when the display panel is the RGBW display panel, and a is an integer greater than zero.

6. The detection device for the display panel of claim 1, wherein the RGBW display panel comprises a first pixel, a second pixel, a third pixel, and a fourth pixel, the detecting signal is input to a (4a+2)th signal source input terminal to detect a pure color image which the first pixel corresponds to when the display panel is the RGBW display panel, and a is an integer greater than zero.

7. The detection device for the display panel of claim 1, wherein the RGBW display panel comprises a first pixel, a second pixel, a third pixel, and a fourth pixel, the detecting signal is input to a (4a+3)th signal source input terminal to detect a pure color image which the first pixel corresponds to when the display panel is the RGBW display panel, and a is an integer greater than zero.

8. The detection device for the display panel of claim 1, wherein the RGBW display panel comprises a first pixel, a second pixel, a third pixel, and a fourth pixel, the detecting signal is input to a (4a+4)th signal source input terminal to detect a pure color image which the first pixel corresponds to when the display panel is the RGBW display panel, and a is an integer greater than zero.

9. A detection device for a display panel, comprising:

twelve signal source input terminals, for inputting a detection signal; and twelve shorting bars, corresponding to the signal source input terminals one on one, one end of the shorting bar being connected to the corresponding signal source input terminal, and the other end of the shorting bar being connected to a corresponding data line on the display panel;

wherein an nth shorting bar is connected to an (n+12m)th data line on the display panel where n is a positive integer smaller than or equal to twelve, and m is an integer greater than zero, wherein the detecting signal is input to all of the signal source input terminals when the display panel is a red, green, and blue (RGB) display panel for detecting a totally bright image shown on the RGB display panel, wherein the RGB display panel comprises a first pixel, a second pixel, and a third pixel, the detecting signal is input to a (3a+2)th signal source input terminal to detect a pure color image which the first pixel corresponds to when the display panel is the RGB display panel, and a is an integer greater than zero.

* * * * *